(12) United States Patent
Biester et al.

(10) Patent No.: US 8,360,392 B2
(45) Date of Patent: Jan. 29, 2013

(54) SLIDE VALVE CONTROL DEVICE AND A DRIVE DEVICE FOR USE WITH IT

(75) Inventors: Klaus Biester, Wienhausen (DE); Peter Kunow, Berlin (DE)

(73) Assignee: Cameron International Corporation, Houston, TX (US)

( * ) Notice: Subject to any disclaimer, the term of this patent is extended or adjusted under 35 U.S.C. 154(b) by 311 days.

(21) Appl. No.: 12/563,605

(22) Filed: Sep. 21, 2009

(65) Prior Publication Data

US 2010/0025604 A1 Feb. 4, 2010

Related U.S. Application Data

(62) Division of application No. 11/570,989, filed as application No. PCT/EP2004/007330 on Jul. 3, 2004, now Pat. No. 7,775,241.

(51) Int. Cl.
*H01F 7/08* (2006.01)
*F16K 11/07* (2006.01)
*F16K 31/02* (2006.01)

(52) U.S. Cl. ......... 251/129.01; 251/129.02; 251/129.09; 251/129.1; 251/129.15; 251/129.22; 335/222; 335/223; 335/234

(58) Field of Classification Search .................. 335/222, 335/229–234, 223; 251/129.01, 129.02, 251/129.09, 129.1, 129.15, 129.22
See application file for complete search history.

(56) References Cited

U.S. PATENT DOCUMENTS

| | | | |
|---|---|---|---|
| 3,305,209 A * | 2/1967 | Bender et al. | 251/129.1 |
| 3,854,499 A | 12/1974 | Sievenpiper | |
| 4,439,700 A | 3/1984 | Menzel et al. | |
| 5,947,155 A * | 9/1999 | Miki et al. | 137/625.65 |
| 6,066,998 A * | 5/2000 | Trumper et al. | 335/229 |
| 7,423,505 B2 * | 9/2008 | Ohta et al. | 335/220 |

FOREIGN PATENT DOCUMENTS

| | | |
|---|---|---|
| DE | 1179775 | 10/1964 |
| DE | 2939829 A1 * | 5/1980 |
| GB | 2185092 | 7/1987 |
| GB | 2256698 | 12/1992 |

OTHER PUBLICATIONS

International Search Report for Appl. No. PCT/EP2004/007330 dated May 25, 2005 (pp. 5).

* cited by examiner

*Primary Examiner* — Ramon Barrera
(74) *Attorney, Agent, or Firm* — Chamberlain Hrdlicka

(57) ABSTRACT

A valve control device, in particular for control pods or similar equipment used in the mining and/or production of mineral oil/natural gas, comprises a valve housing in which hole or boring sections are arranged, and a valve slide movable relative to the hole sections, with at least a first and a second flow hole for the alternative connection of a feed line from a fluid pressure hose with at least one actuator or of the actuator to return line for leading the fluid away, wherein in each case one of the connections is made and the other is interrupted. To improve such a valve control device in that with only slight and economical constructional modifications with retention of all the advantages of known valve control devices, a substantial reduction in the leakage flow is facilitated or even almost completely suppressed, at least first and second valve elements which in the closed position can be pressed onto a valve seat formed especially at a hole section are laterally assigned to the flow holes, wherein in the connection position of the first flow hole the second valve element is in the closed position and in the connecting position of the second flow hole the first valve element is in the closed position each pressed onto the respective assigned valve seat in its closed position.

15 Claims, 4 Drawing Sheets

SLIDE VALVE CONTROL DEVICE AND A DRIVE DEVICE FOR USE WITH IT

CROSS-REFERENCE TO RELATED APPLICATION

Figure 1:
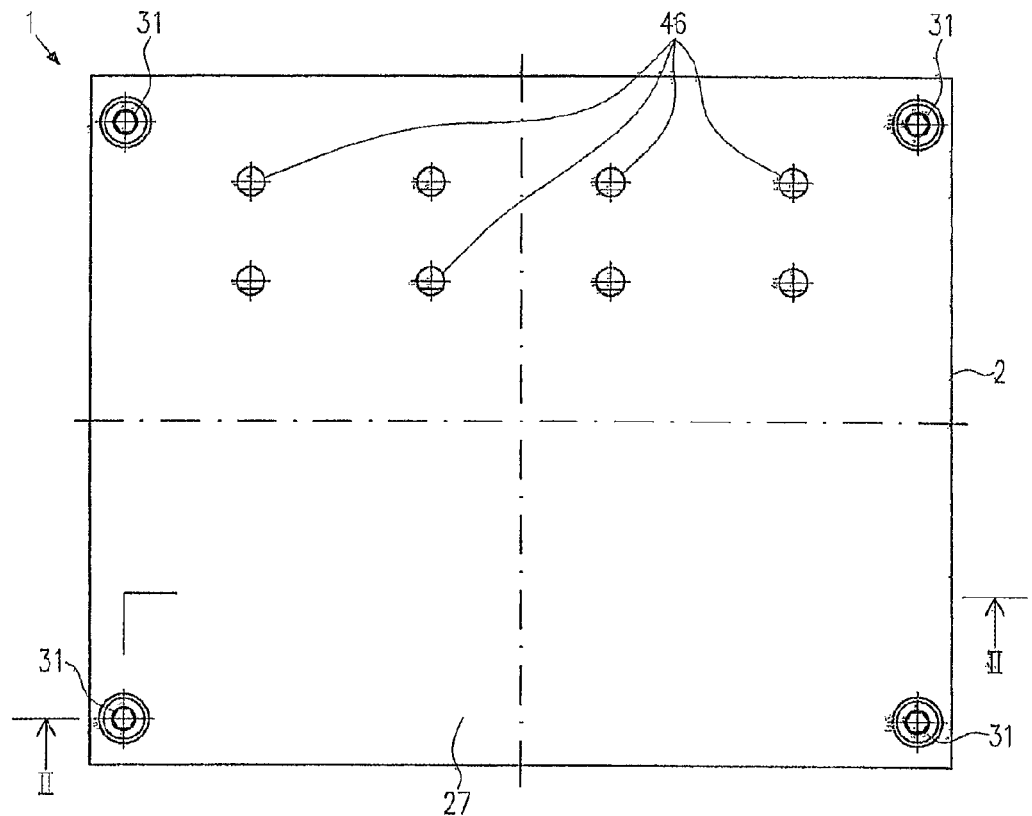

The present application claims priority to PCT/EP2004/007330 filed 5 Jul. 2004 hereby incorporated herein by reference.

BACKGROUND OF THE INVENTION

The invention relates to a valve control device with the features of the generic part of Patent Claim 1 and a drive device which can in particular be used for the valve control device.

Such valve control devices are for example employed with so-called control pods or similar equipment in the mining and/or production of mineral oil/natural gas Such a control pod can for example be arranged on the sea bed and is used at the point of application with a range of valve control devices for the adjustment, actuation and control of valves, throttles, blowout preventers and other equipment.

A suitable valve control device exhibits a valve housing in which various hole sections are arranged. Relative to these hole sections a valve slide with at least a first and a second flow hole is movably supported inside the valve housing. The valve slide is in each case displaced with the flow holes such that the corresponding flow holes complement the hole sections for the flow of an appropriate fluid or, if an appropriate flow hole is not aligned to the hole sections, the flow through these hole sections is interrupted. If the hole sections are complemented by a flow hole, then a connection can alternatively be made by it between a feed line of a fluid pressure source to at least one actuator or between an actuator to a return line for leading the fluid away.

In the first case the fluid is fed to the actuator, whereby it for example actuates a valve, throttle, blowout preventer or similar device. If this actuation is to be interrupted, the fluid which is under pressure is routed through the appropriate flow hole from the actuator to the return line by displacement of the valve slide into another position and by connecting other hole sections.

Appropriate to the number of hole sections, flow holes and return and feed lines, various valve control devices can be realised, such as for example 2/2, 3/2, 4/2, 4/3, 5/2, 5/3 directional control valves or similar devices.

With such a known valve control device the sealing of the hole sections not connected by means of a flow hole occurs by the valve slide itself and appropriate sealing elements between the slide, the hole sections and the valve housing. With such valve control devices it has however been found that especially with the often very high pressures required, particularly in the field of mineral/natural gas mining or production, a leakage flow of the pressure fluid in the respective valve control device with the valve slide in the closed position cannot be neglected. Since generally, many such valve control devices in one control pod or also many control pods with a large number of valve control devices are employed at the point of application, a serious problem arises with regard to the replenishment of pressure fluid as well as regarding contamination of the environment.

BRIEF SUMMARY OF THE PREFERRED EMBODIMENTS

The object of the invention is therefore to improve a valve control device of the type mentioned at the beginning such that with only slight and economical constructional modifications with retention of all the advantages of known valve control devices, a substantial reduction in the leakage flow is facilitated or even almost completely suppressed.

The object is solved by the features of Patent Claim 1.

According to the invention, valve elements are laterally assigned to the appropriate flow holes of the valve slide. In its closed position each of these valve elements can in each case be pressed onto a valve seat, in particular formed on a hole section. In the connected position of the first flow hole, i.e. when it is aligned to the corresponding hole sections, the second valve element is in the closed position and vice versa, when the second flow hole is in the connected position, the first valve element is in the closed position, i.e. the valve elements are in each case pressed onto the assigned valve seats.

In this manner, when the flow hole is displaced for interruption of the assigned hole sections, the hole sections are not sealed by the valve slide itself and, where applicable, appropriate seals, but instead by a respective valve element provided separately for this purpose. Due to the pressing of the valve element onto the valve seat, a good seal is achieved which minimises a corresponding leakage flow and, where applicable, almost eliminates it. The valve elements can be constructed quite simply so that the constructional modifications to the valve slide or the valve housing in the region of the hole sections are relatively slight. This applies analogously also to the costs of such separate valve elements.

There is the possibility that such a valve element can be movably supported in the valve housing relative to the associated valve seat of the hole section. The movement can in this connection be caused by the movement of the valve slide.

However, in order to be able to essentially assign all movable elements to the valve slide and consequently where applicable to also render them easier to maintain or replace, the valve element can be movably supported in the valve slide and in particular in a valve slide receptacle open to the outside. When the valve slide is in an appropriate position, the valve element is pressed onto the valve seat of the corresponding hole section, hence sealing this hole section. When supported in the receptacle open to the outside, the valve element in its closed position moves out of the receptacle so far that it is pressed onto the valve seat to seal it. When the valve slide moves, the valve element can be inserted into the receptacle again so far by relative movement along the valve seat that movement of the valve slide into further positions cannot be obstructed.

Easily produced and well-sealing valve elements can be realised for example in that such a valve element is a valve ball.

When using an appropriate valve element adjacent to and in co-ordination with the flow hole and in order to be able to retain an installed length of the valve slide almost unchanged compared to those without valve elements, the flow hole can at least partially be routed around the receptacle and/or valve elements. This can occur for example through a curved passage of the flow hole.

In this connection it is easier to produce flow holes which exhibit a first subsection pointing away from the receptacle and a second subsection pointing to the valve element. These subsections can each run essentially in a straight line so that both subsections are arranged in an approximate V-shape in combination.

In order to press the valve element onto the valve seat sufficiently, appropriate force application devices, such as springs or similar items are conceivable. The construction of the valve slide with valve elements can however be simplified further if the pressure in the pressure fluid, which is contained in the relevant hole section, is exploited for the displacement and for pressing of the valve element on the valve seat. This can for example occur in that a pressing supply hole opens into the receptacle, which exhibits smaller dimensions compared to the flow hole. It should however be noted that for example with the use of two valve elements, one is movable in the direction of such a hole section and can be pressed on it, the said hole section being connected to the feed line, and the other valve element is movable in the direction of such a hole section and can be pressed on it, the said hole section being connected to the return line. Depending on the construction of the valve control—refer to the directional control valves quoted above—several corresponding valve elements can be moved in the appropriate direction and pressed onto their associated valve seat.

There is the possibility that with frequent actuation of the appropriate valve elements and with a high applied pressure, where applicable, the valve seat is subject to wear and the corresponding sealing effect between the valve seat and the valve element degrades in the course of time. Therefore, in order to be able to replace such a valve seat in a simple manner by a new one, the valve seat can be formed as a seating ring supported, in particular releasably, in the valve housing.

In order to facilitate removal and fitting of the seating ring in a constructively simple manner, a screw-in element with a longitudinal hole can be screwed into the valve housing for fixing the seating ring, whereby the longitudinal hole of the screw-in element and the ring opening of the seating ring form at least part of the appropriate hole section.

In order, if necessary, to be able to design the valve devices more variably and to be able to continue with feed lines and/or return lines in different directions, they can be continued by main feed and/or return lines in the upper and/or lower housing covers.

For simplified access to the valve device for maintenance or repair, the upper and lower housing covers can be releasably attached to one another for fixing the valve housing.

A simple embodiment of such an attachment can be realised by threaded studs. These can extend just between the housing covers or also in addition through the valve housing.

In particular with ball-shaped valve elements, it may prove to be advantageous if the receptacle is formed essentially as a hollow cylinder with an approximately hemispherical bottom section, whereby the pressure supply line opens in the bottom section, in particular centrally.

The valve element is at least partially accommodated by the bottom section when it is not in contact with the valve seat. The valve element is guided along the hollow cylinder when it is pressed in the direction of the valve seat by pressure fluid fed via the pressure supply line and the corresponding valve seat is arranged aligned to the hollow cylinder.

In order to provide a valve seat, which has a good sealing effect and also exhibits a long service life, the seating ring can be eroded at least on its surface which forms the valve seat. In a favourable manner the appropriate surface is formed essentially according to the section of the valve element which presses on it and for example rounded off.

A sufficiently heavy duty and durable valve element can also be obtained in that it is formed at least partially out of ceramics or hard metal.

In order to be able to form the most varied directional control valves and valve control devices for different applications, the valve housing can be especially releasably composed of many housing segments, whereby the valve slide is movably supported in corresponding slide holes of the housing segments. Such housing segments are for example those with a hole section, those for accommodation of the seating ring and screw-in element as well as, if necessary, further segments for the separation of the segments with hole sections, for the termination of the valve housing at the ends, for accommodating a drive device, etc.

The valve slide need not however be supported movably in all housing segments, but rather there is also the possibility that the valve housing is closed off at ends in the movement direction of the valve slide by appropriate housing segments.

The housing segments can be standardised and can also be used in different orientations in order for example to realise hole sections in different orientations. In order to prevent a leakage flow between the housing segments and the valve slide, the housing segments can be sealed one to the other and/or relative to the valve slide.

Simple arrangement and retention of the various housing segments by the housing covers can be achieved in that for example the housing segments exhibit essentially a square or rectangular cross-section and are connected to one another in the region of their four corners. Such a connection can occur using appropriate threaded studs or similar components which, if necessary, can also pass through all housing segments.

Through the application of such housing segments each valve housing with appropriate valve slide is of modular construction. In order to be able to progress further with these variable methods, in particular for different applications and requirements, two or more valve housings can be arranged adjacently between the housing covers and each connected to the main feed and/or return line. In this way, due to the modular construction of the valve control device a large number of actuators or similar devices can be operated simultaneously, while only one main feed or return line is needed and only standardised individual parts are used irrespective of the size of the complete device.

Advantageous arrangements of the main feed or return lines can be seen if they extend lateral to the valve slide in the housing covers. Analogously a suitable actuator supply line, in particular of a valve housing, which extends in the direction of the actuator, can be formed in the longitudinal direction of the valve slide in a housing cover.

In order to be able to arrange and orientate the various valve housings adjacently and also the various segments of a valve housing one behind the other in a simple manner, the housing covers can exhibit an indentation for the interlocking accommodation of the valve housings or housing segments.

If for example only one valve housing is used, the appropriate housing covers exhibit small dimensions and the corresponding indentation is only used for the interlocking accommodation of the housing segments of one valve housing. With the use of two or more valve housings, appropriately larger housing covers are selected which accordingly, with the main lines formed in them, supply the various feed and return lines in each valve housing.

For the further sealing of the seating ring an especially circular-shaped sealing element can also be arranged between the screw-in element and the seating ring.

It has already been pointed out above that the valve housing can also comprise a housing segment for a drive device. This drive device can for example be actuated electrically and assigned to the valve slide for movement in the longitudinal direction. The movement due to the drive device may occur only in one direction, whilst the restoration in the opposite direction may occur using a spring element or similar device. There is also the possibility that the drive device causes the movement of the valve slide in both directions.

In the appropriate drive housing segment the complete drive device can be accommodated and operated separately. The accommodation can also include appropriate control circuits, sensors for monitoring the drive device, etc.

Depending on the length of the valve slide or depending on the field of application for the valve control device, different power ratings of the electrical drive device may also be required. In this respect, the drive device and the motor housing segment may also be of modular construction. This means that the drive housing segment is constructed using appropriate subsegments or contains those which can each comprise subdrive units which may be assembled together to form a powerful drive device.

Generally, the drive device can be actuated by remote control so that essentially no electrical control cables need to be routed to the outside. However, appropriate supply cables may be provided for the electrical supply. In order to be able to route appropriate supply and/or control cables, if necessary, to the outside from the valve control device, at least one supply hole may be arranged for the passage of such cables in at least one housing cover.

There are various methods possible for a movable link between the drive device and the valve slide. For example the drive device can move a plunger to and fro as actuating element which then acts on the valve slide to adjust it. There is also the possibility that the movable link occurs indirectly by means of a gear, etc. A further possibility can be seen in that the valve slide extends up to the motor housing segment and is directly movably connected to the drive device in this segment.

If the valve slide exhibits a circular-shaped cross-section, it may prove to be necessary to define the alignment of the valve slide with respect to the housing segments. This can occur in that the valve slide is supported movably and rotationally rigidly at its slide end facing away from the drive unit in an end segment of the valve housing.

Many methods are conceivable for the rotationally rigid support. In one simple method an alignment protrusion of the valve slide may protrude essentially radially outwards and be guided in an alignment groove in the end segment.

The invention also relates to a drive device which can in particular be used for the adjustment of a valve slide of a valve control device of the previously mentioned type. Using simple construction and an economical method, this drive device should cause a rapid to-and-fro movement of the valve slide, if necessary also directly and should especially be able to be actuated electrically. Such a drive device exhibits at least a stationary fixed magnet and a mobile magnet movably supported relative to it. In order to facilitate a to-and-fro movement, at least one of these magnets can be switched in its magnetic polarisation, whereby, depending on the polarisation, the mobile magnet can be moved to and fro between an attraction and a repulsion position relative to the fixed magnet and is movably connected to an actuating element. Such a drive device is also suitable for the adjustment of other devices where especially a to-and-fro movement between two positions is desired.

If, for example, the fixed magnet and the mobile magnet exhibit opposing magnetic polarisations at their ends facing one another, they will attract and the mobile magnet will move in the direction of the fixed magnet. Due to the movable link to the mobile magnet, the actuating element also moves analogously. If a polarisation is reversed, the fixed magnet and the mobile magnet repel each other so that the mobile magnet moves away from the fixed magnet and the actuating element moves analogously.

In connection with the valve control device the actuating element can be movably connected to the appropriate valve slide or valve spool. In this respect it is sufficient if the actuating element only moves the valve slide in one direction, whereby the movement in the reverse direction can occur for example by means of a force applied by spring elements, etc. However, there is also the possibility that the to-and-fro movement of the actuating element, caused by the appropriate movement of the mobile magnet is transferred to the valve slide in both directions of movement.

The effectiveness of such a drive device can be improved still further in that the mobile magnet is supported for movement to and fro between two fixed magnets, each magnetically reverse polarised with respect to the other. This means that the fixed magnets arranged on both sides of the mobile magnet each face the mobile magnet with poles of the same polarity, so that, depending on its polarisation, it is attracted in the direction of one or other fixed magnet and it is repelled by the other fixed magnet.

There is the possibility that the mobile magnet is a permanent magnet so that the appropriate switching of the magnetic polarisation occurs on the fixed magnets. This is for example possible by means of an appropriate electrical winding and current flow through this winding.

However, in order to require fewer electrical windings and also correspondingly fewer supply and control cables, the mobile magnet can be switchable in its magnetic polarisation.

Although in this connection there is the possibility that also the fixed magnets can be switched in their polarisation and are also formed as electromagnets, the construction of the drive device is however more simple if the appropriate fixed magnets are permanent magnets.

In order to be able to form the mobile magnet in a simple manner with a sufficiently strong magnetic field strength and to form it for switching in its polarisation, it may comprise an iron core and at least one electrical winding on its circumference.

In order to be able to also form the permanent magnets sufficiently strong and at the same time with small dimensions, such a permanent magnet can especially be a sintered neodymium magnet.

The actuating element does not need to be directly connected to the mobile magnet, but can be movably connected to it in suitable manner. Similarly, there is the possibility that the mobile magnet for example extends beyond the fixed magnets perpendicular to its movement direction between the fixed magnets and is movably connected there to an appropriate actuating element. If the actuating element is to be supported and also guided in a simple manner, it may be regarded as advantageous if at least one fixed magnet comprises a guide hole running in the movement direction of the mobile magnet, the actuating element being passed through the said guide hole. This guide hole may especially be formed centrally in the permanent magnet, whereby the actuating element may also be movably connected centrally to the mobile magnet.

In its movement the mobile magnet may also move appropriate actuating elements in both directions in that for example the actuating element protrudes at both ends of the mobile magnet and passes through appropriate guide holes in both assigned fixed magnets. Consequently, an appropriate actuation of an actuator, a valve device or similar device, may occur on both sides of the drive device in the movement direction of the mobile magnet. This can also take place with just one actuating element, which for example also passes through the mobile magnet and is attached to it or with actuating elements which each protrude on one side of the mobile magnet.

To improve the action of the mobile magnet and to realise simplified and fast magnetic reversal requiring little power, the iron core of the mobile magnet may be formed as a short-circuited second winding.

It has already been pointed out above that a suitable drive housing segment for a valve control device according to the invention can also be of modular construction, i.e. made from different housing segments. This may occur for example in that the fixed magnets are each supported in a housing segment, especially of aluminium. This may be ring-shaped or square.

The modular construction of the drive device can be characterised in that in each case a mobile magnet is arranged between two fixed magnets and in each case all mobile magnets are connected to the actuating element.

In order to fit each mobile magnet to the actuating element sufficiently firmly, the actuating element may comprise a longitudinal hole in which at least one engaging element is essentially radially movably supported between a release position and a hold position, whereby in the hold position the engaging element protrudes from a wall opening of the actuating element and engages an engagement recess in the mobile magnet. Such an engaging element may be provided for each mobile magnet. The mobile magnet may also be attached by screwing, wedging, etc. and also by gluing, etc.

A simple method for the displacement of the actuating element can be seen in that at least one wedge element is movably supported in the longitudinal hole in the longitudinal direction. This wedge element may comprise wedge surfaces at various places so that also several mobile magnets are attached to appropriate engaging elements in the associated engaging recesses on the actuating element by the movement of only one wedge element.

In connection with the valve control device according to the invention it is especially advantageous if the actuating element is the valve slide or spool. In this way no movement coupling between the actuating element and the valve slide is necessary, but instead the valve slide is extended on the side of the drive device so far that it passes through it and especially through the fixed magnets and mobile magnets, and the mobile magnets are mounted on the valve slide in an appropriate manner—refer also to the previous descriptions. Consequently the movement of the mobile magnets is directly transferred to the valve slide.

A simple embodiment of an appropriate drive housing can be seen in that it comprises an essentially cylindrical drive housing segment, open at one end and with an attachable cover. If the valve slide is released from the appropriate mobile magnets, if necessary, the complete drive housing can be removed from the valve housing when using the drive device for the valve control device according to the invention. Similarly, there is the possibility of just removing the cover of the drive housing segment and then removing or at least rendering accessible the various housing segments within the drive housing after releasing the mobile magnets from the valve slide.

In this connection the valve slide may extend up into the cover so that the drive housing segment and/or the cover comprise flow holes for the passage of the actuating element or valve slide.

In order to directly arrange the fixed magnets within the drive housing segment and to be able to attach them spaced from one another, fixed magnetic segments for the fixed magnets and retainer rings for the mobile magnets can be arranged within the drive housing segment, especially alternating.

In this connection it may furthermore be regarded as favourable if the retainer rings are simultaneously arranged as spacer elements between the fixed magnet segments.

In order to be able to save an appropriate housing segment at least for the fixed magnet immediately adjacent to the cover of the drive housing, such a fixed magnet may be supported in a cover indentation in the cover. In this connection the cover and the rest of the drive housing may also be produced in aluminium.

There is the possibility of bringing appropriate electrical supply and control cables through the cover out of the drive housing. Another method can also be seen in that the drive housing comprises at least a side opening for the passage of these cables. When used with the valve control device according to the invention, this side opening is for example aligned to the supply hole in the valve housing.

To enable a simple displacement of the engaging element between the release and the hold positions and at the same time to reliably hold the engaging element also in the release position, the wedge element may comprise an end section with a retaining recess for the engaging element in the release position and an adjacent guiding end. In this way the engaging element is always arranged between the appropriate wedge surfaces and in the guiding end. The guiding end may be formed appropriate to the hole within the actuating element or within the valve slide so that it aids the guidance of the wedge element in this hole.

The movement of the mobile magnet away from an attraction position may be supported in that at least one spring element is assigned to the actuating element, especially between the mobile and fixed magnets for applying a force to the mobile magnet away from the fixed magnet. Generally however, such supplementary spring elements may be omitted due to the switching of the polarisation of the mobile magnet and the application of two assigned fixed magnets.

There is the possibility that the reversal of the magnetic polarisation occurs in each case due to the external feed of current of different polarity. However, it is more simple and advantageous if the winding of the mobile magnet is assigned an electrical circuit for the reversal of the current direction. Consequently, no change of polarity of the current or voltage feed externally need take place, but instead an electronic switchover occurs which can also occur, if necessary, much faster and more effectively.

To achieve this, the electrical circuit can generate with a switch, especially an electronic switch, current pulses in the reverse direction which then flow through the electrical winding where they produce a magnetic field, as also especially in the iron core of the mobile magnet, so long until the mobile magnet is released from one fixed magnet and has taken up its attraction position relative to the other fixed magnet. In this connection it should be noted that the attraction position of the mobile magnet relative to one fixed magnet corresponds to the repulsion position relative to the other fixed magnet and vice versa. In the attraction position the mobile magnet can be in direct contact with the fixed magnet.

There is namely the possibility that current continues to flow through the electrical winding of the mobile magnet in the attraction position. However, due to the iron core of the mobile magnet and the appropriate strength of the magnetic field of the fixed magnets it is generally sufficient if the winding is essentially free of holding current between the corresponding current pulses. This means that after the termination of an appropriate current pulse the induced magnetic field of the mobile magnet decays and the attraction position is retained solely based on the attractive force of the corresponding fixed magnet. An appropriate current pulse is again fed, this time with reverse sign, only for moving the mobile magnet in the direction of the other fixed magnet, so that the mobile magnet is repelled from its former attraction position and is moved in the direction of the other fixed magnet. Once the mobile magnet has moved sufficiently far in this direction to take up its new attraction position, the current can again be switched off.

The drive device according to the invention has the advantage especially by the use of current pulses, of the mobile magnet iron core used as a short-circuited winding and of the appropriate electronic circuit that a corresponding switching time for the drive device is less than 10 ms, preferably less than 5 ms and especially preferably less than 1 ms. Such a switching time corresponds here to the time needed for the mobile magnet to move from one fixed magnet to the other.

In the following, advantageous embodiments of the invention are explained in more detail based on the figures enclosed in the drawing.

Figure 2:
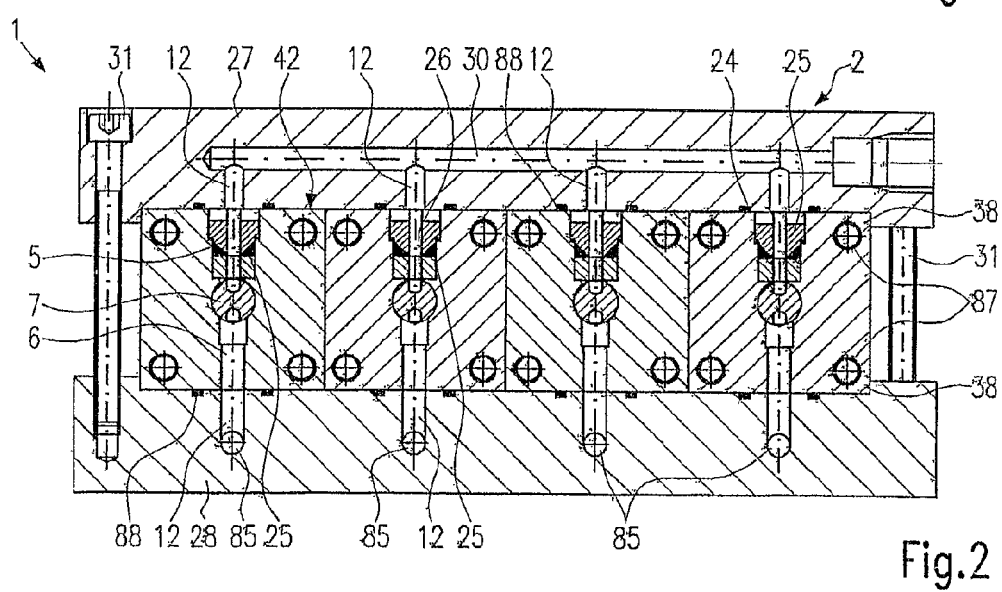
Figure 3:
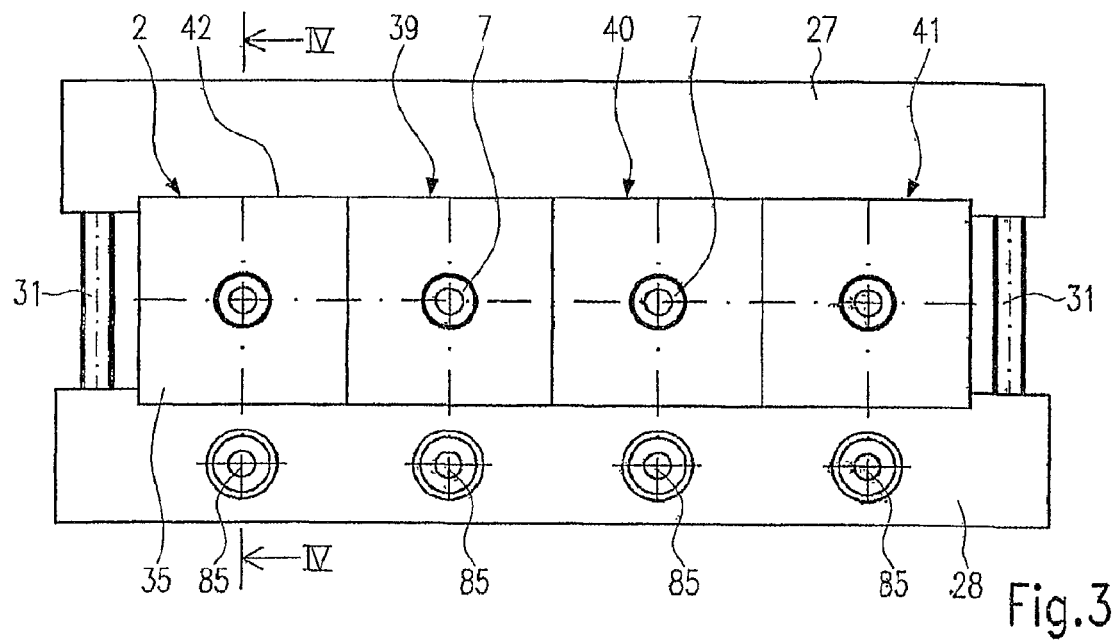
Figure 4:
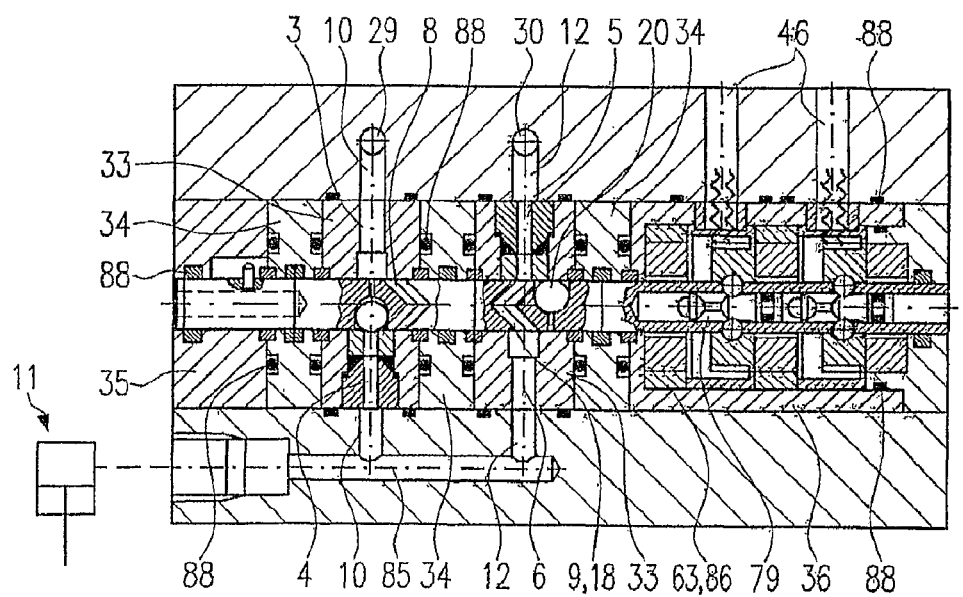
Figure 5:
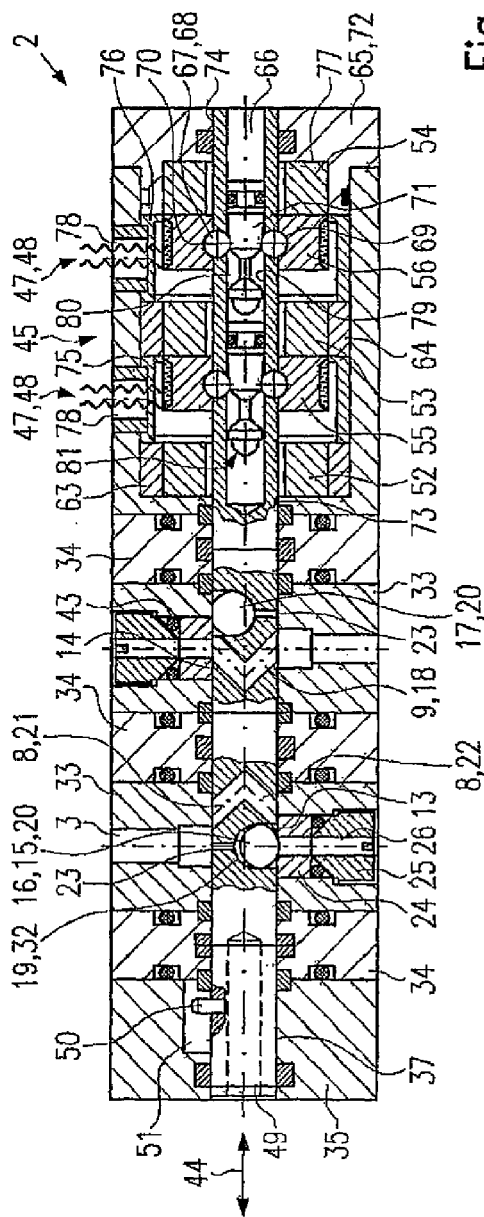
Figure 6:
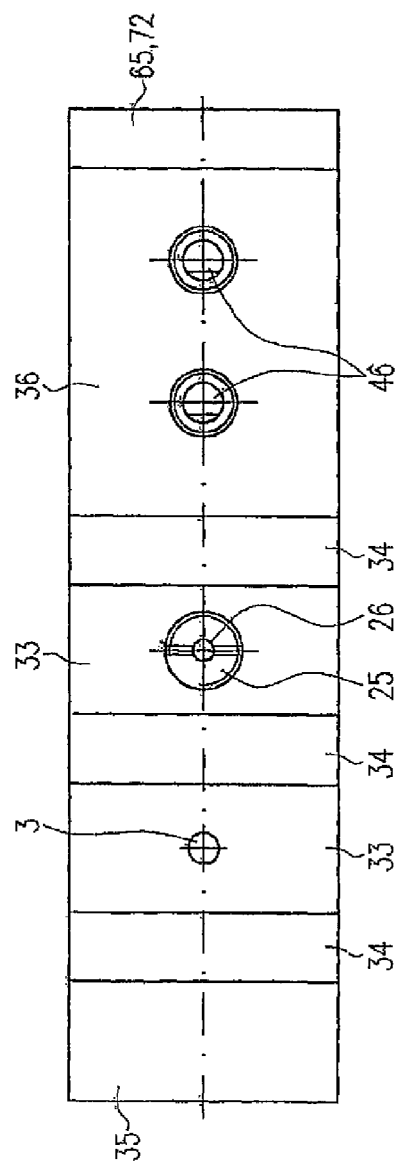
Figure 7:
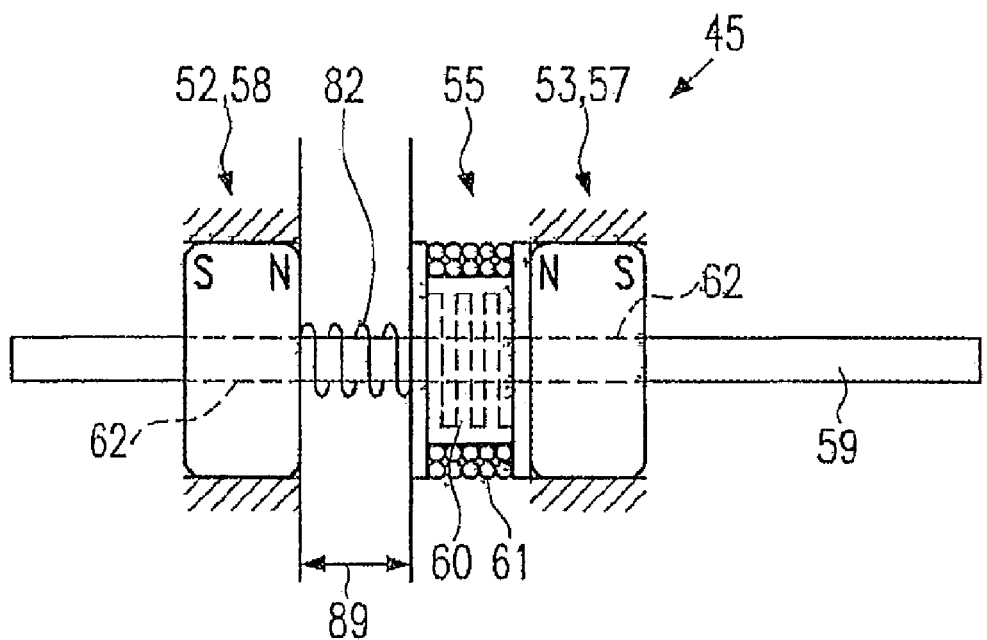

The following are shown:

FIG. 1 a plan view of a valve control device with several valve housings arranged adjacently at the side;

FIG. 2 a section along the line II-II from FIG. 1;

FIG. 3 a front elevation of the valve control device according to FIG. 1;

FIG. 4 a section along the line IV-IV from FIG. 3;

FIG. 5 a valve control device according to FIG. 2 with an appropriate valve housing without housing cover;

FIG. 6 a plan view of the valve housing according to FIG. 5;

FIG. 7 a schematic diagram of the drive device according to the invention, and

Figure 8:
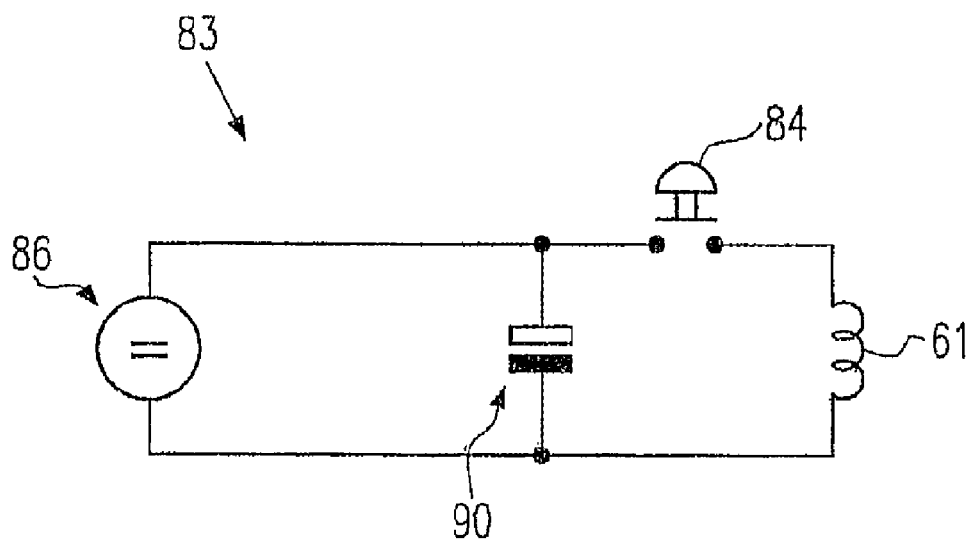

FIG. 8 a schematic diagram of an electrical circuit for the drive device according to FIG. 7.

DETAILED DESCRIPTION OF THE PREFERRED EMBODIMENTS

FIG. 1 shows a plan view of an embodiment of a valve control device 1 according to the invention. The plan view is shown on an upper housing cover 27. This is releasably connected to a lower housing cover 28—refer also to FIG. 2—by means of four threaded studs 31 arranged in its corners. In the upper housing cover 27 four pairs of supply holes 46 are arranged through which the electrical supply and control cables 47, 48 are brought out—refer also to FIG. 5.

The valve control device according to FIG. 1 is for example arranged in a control pod, whereby several of these valve control devices can be present. Such a control pod is used in the mining and production of mineral oil or natural gas for the control of a range of actuators, such as for example valves, throttles, blowout preventers, etc. by means of such valve control devices 1 according to the invention.

In FIG. 2 a section along the line II-II from FIG. 1 is illustrated.

The valve control device 1 according to FIG. 2 comprises four valve housings 2, 39, 40, 41 arranged adjacent to one another. These are held interlocking in an appropriate indentation 42 in the upper and lower housing covers 27, 28 where they are fixed by means of the appropriate mounting of the housing covers using threaded studs 31. The appropriate valve housings 2, 39, 40, 41 are arranged directly adjacently and have a square cross-section.

Lateral to the longitudinal direction of the appropriate valve housing in the upper housing cover 27 a main return line 30 is arranged from which the pressure fluid can be fed back via the various valve housings from appropriate actuators via actuator supply lines 85 formed in the lower housing cover 28. In the region of each valve housing a return line 12 branches off the main return line 30, whereby this occurs analogously also for the return lines 12 in the region of the lower housing cover and for connection to the actuator supply lines 85.

The valve control device 1 according to FIG. 2 is used with the four valve housings for the control of four different actuators—refer to the corresponding actuator supply lines 85. The individual valve housings are sealed using sealing elements 88 at least relative to the housing covers. The sealing occurs especially on both sides adjacent to the corresponding return lines 12.

In the corners 38 of the valve housings, which are square in cross-section, threaded studs 87 are screwed in, which releasably attach together various housing segments of a single valve housing, whereby a modular construction of the complete valve control device 1 is facilitated by these housing segments and also by the adjacent arrangement of the individual valve housings.

Within each valve housing 2, 39, 40, 41 a valve slide or spool, in the following only referred to as slide, 7 is movably supported. This is arranged approximately in the middle of each valve housing. Depending on the position of the valve slide, a connection of the return lines 12 occurs so that pressure fluid can be fed back from the actuator supply line 85 to the main return line 30 or to the individual return lines 12 or from the main feed line 29 to the actuator supply line 85. In this way the appropriate actuator is controlled in its actuation.

In the upper half of each valve housing according to FIG. 2 a screw-in element 25 is arranged, between which and the valve slide 7 a seating ring 24 is arranged in each case. This seating ring is used for pressing on a valve element—refer also to FIG. 4. Each of the screw-in elements 25 comprises a longitudinal hole 26 which together with the central opening of the seating ring 24 forms a first hole section 5. This connects the appropriate return line 12 to the valve slide 7. An appropriate hole section 6 is also formed on the side of the valve slide 7 facing the return line 12 for the return of the pressure fluid with regard to the actuator supply line 85.

A circular sealing element 43 is in each case arranged between the screw-in element 25 and the seating ring 24. The screw-in element 25 is screwed into the valve housing from the return line 12—refer also to the screw-in slot in FIG. 6—and presses the seating ring 24 on a corresponding shoulder within the valve housing directly above the valve slide 7.

It should be noted that the same parts in all the figures are designated by the same reference symbols and are sometimes explained only in conjunction with one figure.

FIG. 3 shows a front elevation of the valve control device 1 according to FIG. 1. In particular it can be seen how the actuator supply lines 85 open out in a face side of the lower housing cover 28. Furthermore, it can be seen that the corresponding valve slide 7 of each valve housing 2, 39, 40, 41 is visible at the end of the corresponding valve housing in a hole such as a boring which is open on the outside.

With the use of housing covers 27, 28 with small dimensions lateral to the valve housings, only for example three, two or only one valve housings can be arranged between the housing covers. Similarly there is the possibility of arranging more than four valve housings adjacently, in particular side-by-side. It is also possible to arrange valve housings not just adjacently in the horizontal direction, but also one above the other in the vertical direction. This can occur for example with the arrangement of an intermediate cover between various horizontal rows of valve housings in order to supply them appropriately with pressure fluid or to return pressure fluid from the corresponding actuators.

In FIG. 4 a section along the line IV-IV through the valve housing 2 according to FIG. 3 is illustrated. The section according to FIG. 2 corresponds here to a section through FIG. 4 in the region of the return line 12 or the main return line 30.

In FIG. 4 the upper and lower housing covers 27, 28 are illustrated—refer also to FIG. 3—while in FIG. 5 the corresponding device without these housing covers is illustrated.

The valve housing 2 as such is composed in the longitudinal direction 44 of the valve slide 7 of a row of housing segments. Various housing segments 33 contain the actual valves, whereby these housing segments are spaced by further housing segments 34. Furthermore, at the left end in FIG. 4 an end segment 35 and at the opposite end a drive housing segment 36 are arranged.

Between the individual housing segments and between these and the valve slide a row of sealing elements 88 is arranged. The valve slide passes through appropriate slide holes 37 in each of the housing segments and extends over the complete length of the valve housing. At its slide end 49 facing the end segment 35, the valve slide has a pin-shaped alignment protrusion 50. This is spaced radially outwards from the valve slide and is guided in an alignment groove 51 in the end segment 35.

The various intermediate housing segments 34 are essentially all constructed the same and act as spacers for the valve housing segments 33. These are also essentially constructed the same and—refer to FIGS. 4 and 5—are inserted in reverse in each case. Each of the valve housing segments comprises hole or boring sections 3, 4, 5 and 6 which are accordingly connected to the feed line 10, return line 12 or to the analogous feed lines 10 or return lines 12 on the side of the actuator supply line 85. The corresponding hole section 3 in the valve housing segment 33 nearest to the end segment 35 opens into the corresponding slide hole 37, whereby in this region in the valve slide 7 a first flow hole 8 and a first valve element 16 are arranged. The first flow hole 8 comprises as does also the second flow hole 9 in the adjacent valve housing segment 33 a first subsection 21 and a second subsection 22 in each case, which run at an angle to each other, forming an approximate V-shape. The first subsection 21 is assigned to the hole section 3 and the second subsection 22 to the hole section 4 with appropriate positioning of the valve slide. In the position of the valve slide 7 illustrated in FIG. 4 no flow occurs through the first flow hole 8. Instead the pressure fluid is passed via the hole section 3 and a pressure supply hole 23 to the corresponding valve element 16, wherein this is in its closed position 15. In this closed position it contacts its seating ring 24 with valve seat 13. The valve seat 13 is formed by an opening edge of the seating ring 24. The central opening of the seating ring 24 and the longitudinal hole 26 of the screw-in element 25 together form the corresponding hole section 4. The dimensions of the pressure supply hole 23 are less than those of the associated flow hole 8 or 9, so that the corresponding valve element is always pressed by a sufficiently high pressure tightly onto the valve seat 13 or 14 in the closed position.

The second flow hole 9 is in its connecting position 18 in FIG. 4 so that fluid from the actuator 11—refer to FIG. 4—can be routed via the actuator supply line 25, return line 12, hole section 6, second flow hole 9, hole section 5 and a further return line 12 back to the main return line 30. The corresponding valve element 17, which is arranged laterally adjacent to the second flow hole 9, is brought back into its appropriate receptacle 19 and makes contact with an approximately hemispherical bottom section 32 of the receptacle 19.

When feeding pressure fluid from actuator 11, the valve slide 7 is moved so far to the left in FIG. 4 that the valve element 16 is no longer in the closed position 15, but instead is pressed back into its corresponding receptacle 19, while the first flow hole 8 makes the connection between the hole sections 3 and 4 so that pressure fluid can be routed via the main feed line 29, feed line 10, hole section 3, first flow hole 8, hole section 4, feed line 10 and actuator supply line 85 to the actuator 11. Correspondingly the valve element 17 is in sealing contact on the corresponding seating ring 24.

With regard to the valve element it should be noted that this for example is made from ceramics or hard metal. The corresponding valve seat of the seating ring is generally eroded. Consequently, overall reliable and relatively wear-free sealing is provided with the respective valve element in the closed position 15.

Due to the V-shaped arrangement of the appropriate subsections 21, 22, only a slight movement of the valve slide is required to switch between the closed and the connecting positions 15 of the valve elements 16, 17 and the flow positions of the first, respectively second flow hole 8, 9.

It is again pointed out that the description here is given with regard to both FIGS. 4 and 5, wherein also the position of the valve slide is the same in both figures so that the valve element 16 is pressed in the closed position 15 onto the valve seat 13 and the valve element 17 is arranged sidewards displaced relative to its valve seat 14. The corresponding valve elements 16, 17 are especially formed as valve balls 20.

With regard to the screw-in element 25—refer also to FIG. 6—it should be noted that an appropriate sealing element 43 is arranged—refer also to FIG. 2—in each case between the screw-in element and the assigned seating ring.

Similarly, is should also be noted that the various valve housings 39, 40, 41 according for example to FIG. 3 are constructed analogously to FIGS. 4 and 5.

The drive housing segment 36 is arranged in the respective right-hand part of the valve housing according to FIGS. 4 and 5. This contains a drive device 45 for the valve slide 7. The drive housing segment 36 is formed approximately pot-shaped with a corresponding cross-section of the valve housing and is closed at its open end by a cover 72 as a further housing segment 65. Also in the drive housing segment and in the cover 72 appropriate flow holes 73, 74 are formed through which the valve slide 7 extends. Within the drive housing segment the drive device 45 comprises in the illustrated embodiment 3 stationary fixed magnets 52, 53 and 54 and mobile magnets 55, 56 which are movably supported in each case between a pair of them. The mobile magnets 55, 56 are attached to the valve slide 7. The attachment is realised using wedge elements 71 with an end section 79 which are movably supported in a longitudinal hole 66 of the valve slide 7. By moving the wedge elements 71 spherical engaging elements 67 can be moved into a holding position 68—refer for example to FIG. 5. In this holding position 68 the engaging elements 67 protrude radially outwards out of a wall opening 69 over the valve slide 7 and engage corresponding grooves or engaging recesses 70 of the corresponding mobile magnets 55, 56 in order to attach them to the valve slide 7. The corresponding wedge elements 71 have adjacent to the wedge surfaces in the end section 79/80 receptacles which accommodate the engaging elements 67 when the wedge elements 71 in FIG. 5 are moved to the right. In this position the engaging elements are prevented from coming out of the receptacles 80 by an appropriate guiding end 81 of each wedge element 71.

Within the drive housing segment 36 various other housing segments 63, 64, 65 are arranged. It has already been pointed out that the housing segment 65 forms a cover 72 for closure of the motor housing segment 36. The other housing segments 63 and 64 are used for fixing the stationary fixed magnets 52 and 53 and also as retainer rings 75, 76 which accommodate the corresponding movable mobile magnets 55, 56 and keep the other housing segments 63, 64, 65 at a distance.

With regard to one of the stationary fixed magnets—see reference symbol 54—it should be noted that it is supported in an appropriate cover indentation 77 of the cover 72.

In conjunction with FIG. 4 reference has already been made to the supply holes 46 in the upper housing cover 27. To these are aligned appropriate openings 78 in the valve housing or appropriate openings in the retainer rings 75, 76. They are used for the passage of the electrical supply and control cables 47, 48 of the corresponding mobile magnets 55, 56 also during their movement together with the valve slide 7.

The stationary fixed magnets 52, 53 and 54 are formed as permanent magnets and especially as neodymium magnets. The mobile magnets 55, 56 are in contrast formed as electromagnets with an iron core 60 with an electrical winding 61 fitted to them externally—see also FIG. 7. The polarisation of the magnetic field of the mobile magnets 55, 56 changes according to the current applied via the corresponding electrical cables 47, 48, so that the mobile magnets are respectively attracted or repelled corresponding to the alignment of the magnetic poles of the fixed magnets. In FIG. 5 the appropriate mobile magnets 55, 56 are each in the attraction position 57 relative to the fixed magnets 53 and 54 and in the repulsion position 58 relative to the fixed magnets 52 and 53—see also FIG. 7.

The arrangement of the drive device 45 according to FIGS. 4 and 5 is only an example. There is also the possibility of substituting the drive device between the valve housing segments 33 or also of substituting the arrangement with regard to the end segments 35. Due to the to-and-fro movement of the mobile magnets 55, 56 between the assigned fixed magnets 52, 53, and 53, 54, an analogous to-and-fro movement of the valve slide 7 arises independently of the arrangement of the drive device 45. Furthermore it should be pointed out that the formation and arrangement of the valve housing segments is also variable in order to realise various directional control valves, such as 2/2, 3/2, 4/2, 4/3, 5/2, 5/3 directional control valves, etc. Similarly there is the possibility of realising the movement of the valve slide 7 in one direction due to appropriate force application using a spring element or similar component, while only the movement in the other direction is realised by the drive device 45. In this case for example a fixed magnet 52 would not be needed. Also, the force application can be used in addition to the illustrated drive device according to FIGS. 4 and 5.

In FIG. 6 a plan view of the valve housing 2 is illustrated according to FIG. 5. Again the various housing segments 33, 34, 35 and 36 can be seen with the cover 72. These have—see also FIG. 3—an approximately square cross-section.

With the valve segment 33 with the screw-in element 25 on the upper side, it can also be seen that here a screw-in slot is formed for screwing in the screw-in element 25 and therefore for the fixing of the corresponding seating ring 24.

In the region of the drive housing segment 36 the two supply holes 46 can be seen, through which the appropriate electrical supply and control cables 47, 48 can be brought out of the valve housing.

In FIG. 7 a simplified schematic diagram of a drive device is shown as it is employed together with the valve control device 1 according to the previous figures.

In this case the drive device comprises two fixed magnets 52, 53, between which a mobile magnet 55 can be moved to and fro. The letters "N" and "S" indicate in the usual way the corresponding polarisation of the magnetic field of the fixed magnets 52, 53 which are formed as permanent magnets. Depending on the polarisation of the mobile magnet 55 with the iron core 60 and the electrical winding 61 fitted to it, it is either attracted by the left or the right fixed magnet 52, 53 and, due to the corresponding assignment of the magnetic poles of the fixed magnets, repelled in each case by the other fixed magnet. In FIG. 7 the mobile magnet 55 is arranged in an attraction position 57 with regard to the fixed magnet 53 and in a repulsion position 58 with regard to the fixed magnet 52. With the current flow through the electrical winding 61 reversed, the magnetic polarisation of the mobile magnet 55 is also changed so that then an attraction by the fixed magnet 52 and a repulsion by the fixed magnet 53 occurs and the mobile magnet 55 is moved into an attraction position with respect to the fixed magnet 52 and consequently takes up the corresponding repulsion position 58 with regard to the other fixed magnet 53. The relevant fixed magnets 52, 53 exhibit appropriate guide holes 62 through which an actuating element 59 is passed. This actuating element 59 is connected to the mobile magnet 55—see also FIG. 5—so that the actuating element 59 moves to and fro together with the mobile magnet 55.

With the valve control device according to the invention the actuating element 59 is directly the valve slide. However, there is also the possibility that for example the actuating element 59 presses with one of its ends onto an assigned end of the valve slide 7 and correspondingly with the movement of the actuating element 59, the valve slide 7 is also moved. The resetting of the valve slide 7 could in this connection for example occur using a spring element, etc.

The distance 89 between the mobile magnet 55 and the fixed magnet 52 according to FIG. 7 corresponds to the movement stroke of the mobile magnet, whereby it corresponds to a movement stroke of the valve slide 7 in order to realise the different connecting positions 18 of the first and second flow hole or closed positions 15 of the first and second valve elements 16, 17.

FIG. 7 also illustrates a spring element 82 which is arranged on the actuating element 59 and supports the displacement of the mobile magnet 55 into the position shown in FIG. 7. Generally, however such a spring element 82 may be omitted.

The drive device 45 according to the invention can execute switching from the attraction and repulsion positions and therefore corresponding movement of the mobile magnet in the direction of the other respective fixed magnet in the region of a few milliseconds, i.e. in less than 10, less than 5 and also less than one millisecond. Consequently, the drive device 45 according to the invention is suitable for extremely short switching times. Furthermore, due to the formation of the fixed magnets 52, 53, 54 as permanent magnets, it is not necessary that a current flows continually through the electrical winding 61. The appropriate iron core 60 of the mobile magnet is held in the corresponding attraction position 57 also without such a holding current. A short current pulse, which changes the magnetic polarisation of the mobile magnet and leads to an attraction by the fixed magnet 52 and a repulsion by the fixed magnet 53, is required only for the movement of the mobile magnet in the direction of the other fixed magnet 52. Consequently, the winding carries no holding current between the corresponding current pulses for magnetic reversal of the mobile magnet.

An electrical circuit 83 suitable for feeding such current pulses is shown schematically in FIG. 8. This comprises essentially a direct voltage source 86, a capacitor 90 and a switch 84. On actuating the switch 84 a current pulse flows through the appropriate winding 61 and a corresponding circuit for feeding a current pulse of reverse polarity is similarly simply constructed.

There is in this respect the possibility of supplying all electrical windings of the various mobile magnets with current pulses from the same circuits, whereby, if applicable, an inversion or feed reversal of the current pulses to the individual windings is needed.

The invention claimed is:

1. A valve control device comprising:
   a valve slide; and
   a drive device comprising:
      first and second stationary fixed magnets and a mobile electromagnet movably supported between the first and second stationary fixed magnets;
      wherein the magnetic polarisation of the mobile electromagnet can be reversed upon application of an electric current, and depending on the polarisation of the mobile electromagnet, the mobile electromagnet is reciprocably movable between the fixed magnets between an attraction position proximate one of the stationary fixed magnets and a repulsion position proximate the other stationary fixed magnet;
      wherein the mobile electromagnet is positioned in either the attraction or repulsion position without a current applied to the mobile electromagnet; and
      an actuating element connected to and movable with the mobile electromagnet; and
   wherein movement of the actuating element displaces the valve slide.

2. A valve control device according to claim 1 wherein the mobile electromagnet is supported for reciprocable movement between the first and second stationary fixed magnets, the stationary fixed magnets being positioned such that magnetic poles with the same polarity are facing each other.

3. A valve control device according to one of claim 1 wherein the stationary fixed magnets are permanent magnets.

4. The valve control device according to claim 1 wherein the mobile electromagnet comprises a core of magnetisable material with at least one electrical winding on its circumference.

5. The valve control drive device according to claim 3 wherein the first and second stationary fixed permanent magnets include a guide hole running in the movement direction of the mobile magnet and through which the actuating element is passed.

6. The valve control device according to claim 1 wherein the first and second stationary fixed magnets are supported in a housing segment of aluminium.

7. The valve control drive device according to claim 1 further comprising a cylindrical drive housing segment, open at one end, with fit-on cover.

8. The valve control device according to claim 1 further including at least one spring element engageable with the mobile electromagnet for forcing the mobile electromagnet away from either the first or second stationary fixed magnet.

9. The valve control device according to claim 1 wherein a switching time for the drive device is less than 10 ms, less than 5 ms, or less than 1 ms.

10. The valve control device according to claim 1 wherein the valve control device is included in a subsea control pod capable of controlling subsea oil and gas mining and production equipment.

11. The valve control device according to claim 1, wherein the magnetic field of the first or second stationary fixed magnet is sufficient to hold the mobile electromagnet in the attraction position or the repulsion position even when there is no current passing through the mobile electromagnet.

12. The valve control device according to claim 1, further comprising a third stationary fixed magnet and a second mobile electromagnet movably supported between the second and third stationary fixed magnets.

13. The valve control device according to claim 1, wherein the magnetic polarisation of the mobile electromagnet can be reversed with a pulse of electric current.

14. A drive device for the displacement of a valve slide of a valve control device, the drive device comprising:
   at least one stationary fixed permanent magnet;
   at least one mobile magnet movably supported relative to the stationary fixed magnet, the mobile magnet comprising an iron core and at least one electrical winding around the core;
   wherein the mobile magnet can be switched in its magnetic polarisation and, depending on the polarisation, the mobile magnet is reciprocably movable relative to the stationary fixed magnet between an attraction position and a repulsion position;
   wherein the magnetic field of the stationary fixed magnet is sufficient to hold the mobile magnet in the attraction position even when there is no current passing through the electrical winding of the mobile magnet;
   an actuating element movably connected to the mobile magnet;
   a valve control device comprising a valve slide; and
   wherein movement of the mobile magnet in operation displaces the valve slide.

15. The drive device according to claim 14, further comprising more than one fixed magnet and wherein the attraction position is proximate one of the fixed magnets and the repulsion position is proximate another of the fixed magnets.

* * * * *